(12) United States Patent
Joseph et al.

(10) Patent No.: US 7,876,324 B2
(45) Date of Patent: Jan. 25, 2011

(54) METHOD AND SYSTEM FOR DEVELOPING A STRATEGY FOR USE IN A CONTROLLER AND STORAGE MEDIUM FOR STORING INSTRUCTIONS WHICH EFFECTUATE THE METHOD

(75) Inventors: Andrew H. Joseph, Milford, MI (US); Larry E. Stockline, Brighton, MI (US)

(73) Assignee: Promess, Inc., Brighton, MI (US)

( * ) Notice: Subject to any disclaimer, the term of this patent is extended or adjusted under 35 U.S.C. 154(b) by 683 days.

(21) Appl. No.: 11/786,500

(22) Filed: Apr. 12, 2007

(65) Prior Publication Data

US 2008/0252643 A1 Oct. 16, 2008

(51) Int. Cl.
G09G 5/22 (2006.01)
G06T 11/20 (2006.01)
(52) U.S. Cl. .................................. 345/440; 345/440.1
(58) Field of Classification Search .................. 345/440, 345/440.1
See application file for complete search history.

(56) References Cited

U.S. PATENT DOCUMENTS

| | | | |
|---|---|---|---|
| 5,539,652 | A | 7/1996 | Tegethoff |
| 5,621,639 | A | 4/1997 | Fray |
| 6,088,030 | A * | 7/2000 | Bertram et al. ............. 345/440 |
| 6,195,591 | B1 | 2/2001 | Nixon et al. |
| 6,523,045 | B1 | 2/2003 | Beatty |
| 6,931,288 | B1 | 8/2005 | Lee et al. |
| 6,970,758 | B1 | 11/2005 | Shi et al. |
| 6,993,404 | B2 | 1/2006 | Lev-Ami et al. |
| 2005/0035967 | A1 * | 2/2005 | Joffrain et al. ............... 345/440 |
| 2006/0055697 | A1 * | 3/2006 | Yoshioka et al. ............ 345/440 |
| 2007/0188496 | A1 * | 8/2007 | Igusa ......................... 345/440 |

FOREIGN PATENT DOCUMENTS

WO   WO 2006/064362 A2   6/2006

OTHER PUBLICATIONS

Application Specific Documentation—Piston Ring Inspection Station, pp. 2-11, Apr. 4, 2002.
The Problem Solver—PC-PRO Monitoring System—DC Motor Testing #1780, 2005-2006, pp. 1, 1-2, 1-4.
EMAC User Manual/Revision 3.7, 2006, pp. 1, 80-86.

* cited by examiner

*Primary Examiner*—Chante Harrison
(74) *Attorney, Agent, or Firm*—Brooks Kushman P.C.

(57) ABSTRACT

A method and system for developing a strategy for use in a controller and storage medium for storing instructions which effectuate the method are provided. A computer graphical approach of at least one embodiment of the invention eliminates computer programming by presenting a user with a blank 2-dimensional graph on a computer screen along with X and Y axes. Using available toolbars and palettes, the user drags appropriate graphical objects into the graph. Each object represents an operation to perform data analysis or monitoring such as: data acquisition, data transformation or operating limits.

45 Claims, 16 Drawing Sheets

Fig. 9

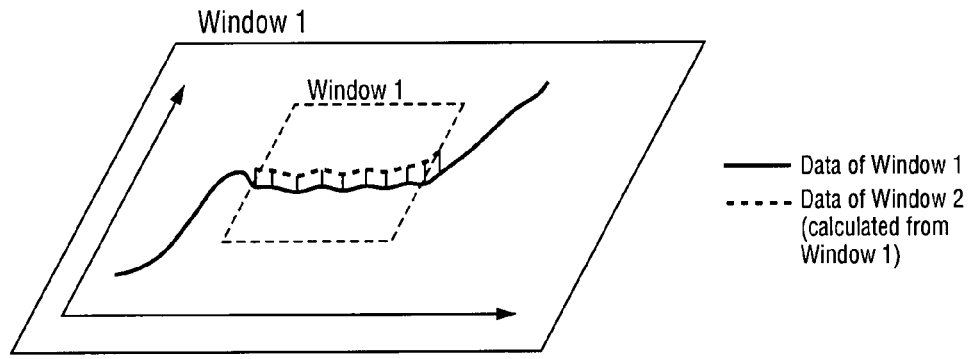
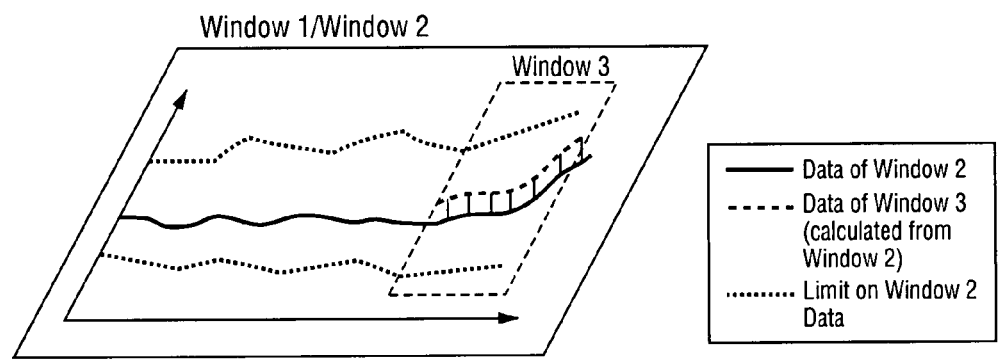
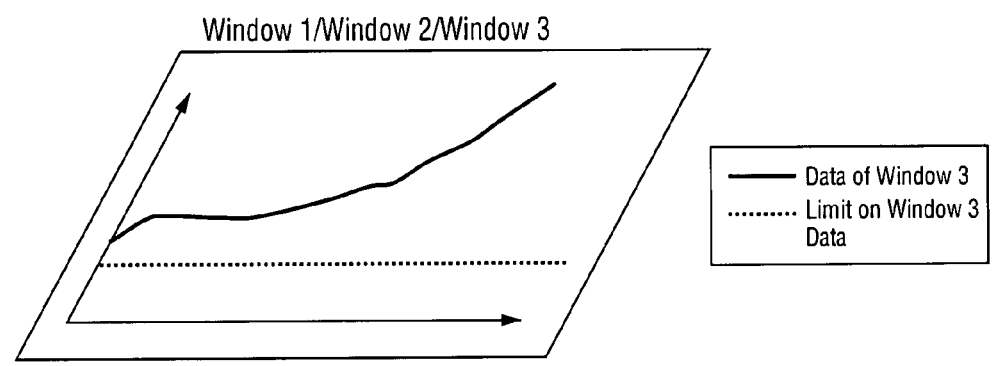
Fig. 13

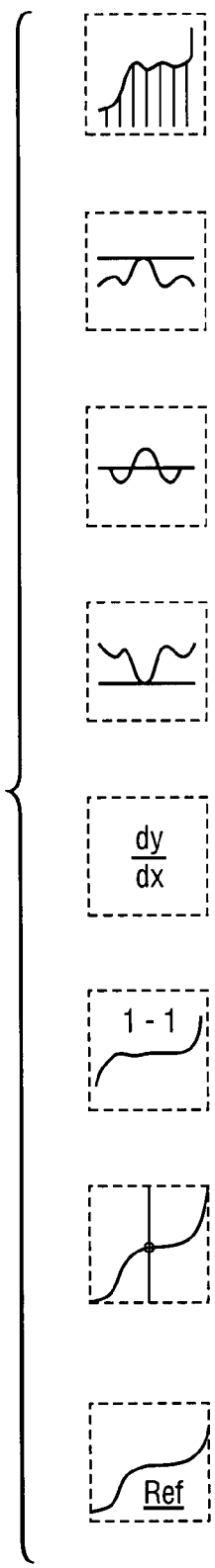

Acquire

This function acquires a y/t or y/x graph. It does not analyze any parent window data.

Maximum

Forms a maximum curve from parent window data.

Average

Forms a average curve from parent window data.

Minimum

Forms a minimum curve from parent window data.

dy/dx

Computes a dy/dx curve from parent window data.

Lift

Copies the parent window data one-for-one.

Line Cross

Produces a point curve (with a single point) where parent window data crosses am arbitrary line. This was formerly called "gradient crossing".

Reference Curve

References a curve in another part of the system. This curve is "lifted" into this window but data is only referenced; not copied.

*Fig. 16a*

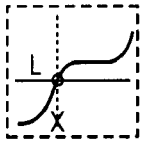 Level Trigger Marker

An x-axis marker that is computed where the window function reaches a level.

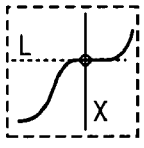 Inverted Level Trigger Marker

A y-axis marker that is computed where the window function reaches a level a threshold along the x axis.

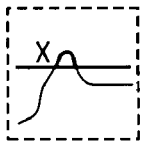 Upper-style Limit

An upper vertical limit against the window function.

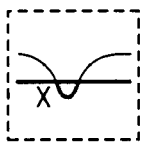 Lower-style Limit

A lower vertical limit against the window function.

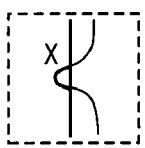 Left-style Limit

A lower horizontal limit against the window function.

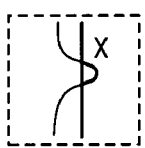 Right-style Limit

An upper horizontal limit against the window function.

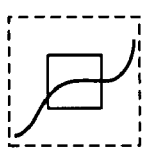 Box-style Limit

An all-around limit against the window function.

*Fig. 16b*

METHOD AND SYSTEM FOR DEVELOPING A STRATEGY FOR USE IN A CONTROLLER AND STORAGE MEDIUM FOR STORING INSTRUCTIONS WHICH EFFECTUATE THE METHOD

BACKGROUND OF THE INVENTION

1. Field of the Invention

This invention relates to methods and systems for developing strategies for use in controllers and storage media for storing instructions which effectuate the methods.

2. Background Art

It is common to analyze and monitor data collected by electronics during a manufacturing process or a part-quality testing process (i.e., "process data"). This typically involves acquiring measurement data from one or more sensors, numerically transforming the measurement data, and comparing the transferred data against limits to check for compliance to an established norm. This is all done within an embedded controller device and is visually presented on a desktop PC or operator panel HMI (i.e., human-machine interface) PC.

The computer code that performs the data analysis and monitoring during the process is often called a "strategy." The most widely employed approach to strategy development is hand-written computer code such as Matlab, C, C++, Labview, or Visual Basic. Solutions using this approach are usually fixed in structure and are parameter-driven for minor adjustments to the strategy. Major strategy changes must be made by an experienced software programmer.

Prior art document entitled "Application Specific Documentation—Piston Ring Inspection Station," pp. 2-11, Apr. 4, 2002, discloses a file Hirata Graphs.xls with Excel.

Prior art document entitled "The Problem Solver—PC-PRO Monitoring System—DC Motor Testing #1780," 2005-06, discloses an example application wherein a custom monitoring strategy is created by writing code.

Prior art document entitled "EMAC User Manual/Revision 3.7," pp. 1, 80-86, 2006, discloses a fixed monitoring strategy.

The U.S. patent to Tegethoff, U.S. Pat. No. 5,539,652, discloses a user interface that provides a spreadsheet-like table to simplify "what if" analysis, and provides graphical and textual output of simulated test results.

The U.S. patent to Nixon, et al., U.S. Pat. No. 6,195,591, discloses a graphics generator that furnishes a user capability to design graphical views to be associated with particular control templates.

The U.S. patent to Shi, et al., U.S. Pat. No. 6,970,758, discloses a charge client that allows a user to view, modify, and perform "what if" analysis on statistical process control charts.

Published PCT application to Mathiesen, et al., WO2006/064362 A2, discloses a graphical means to select an estimator or control strategy. Also described is a graphical user interface that comprises graphically manipulatable means to select or configure information relevant for adjustment or correction of one or more parameters in a control loop.

Other related U.S. patents include: U.S. Pat. Nos. 5,621,639; 6,523,045; 6,931,288 and 6,993,404.

SUMMARY OF THE INVENTION

An object of the present invention is to provide a method and system for developing a strategy for use in a controller and storage medium for storing instructions which effectuate the method, wherein, in at least one embodiment of the invention, computer programming is eliminated through the use of computer graphics.

In carrying out the above object and other objects of the present invention, a method for developing a strategy for use in a controller using a computer system is provided. The method includes the steps of displaying graphical representations of possible data analysis and monitoring operations on a display of the system, displaying a graph on the display and receiving commands from a user of the system to select graphical representations from the displayed graphical representations and to display the selected graphical representations on the graph. The selected graphical representations correspond to desired data analysis or monitoring operations. The method also includes automatically generating a strategy which corresponds to the selected graphical representations on the graph.

The method may further include displaying a graphical representation of processed data on the graph.

The selected graphical representations may be objects having interdependencies and states.

At least one of the graphical representations may represent one of: data acquisition, data transformation and operating limits.

The strategy may be a monitoring strategy.

The monitoring strategy may be a program-wide monitoring strategy.

The monitoring strategy may be a macro-wide monitoring strategy.

The monitoring strategy may be a side-step monitoring strategy.

When the controller is programmed with the strategy, the programmed controller may perform data analysis and monitoring.

The graph may be a 2D graph having orthogonal axes.

The method may further include automatically updating the interdependencies and states.

The method may further include acquiring the processed data from the controller prior to the step of displaying the graphical representation of the processed data on the graph.

The method may further include retrieving the processed data from a database prior to the step of displaying the graphical representation of the processed data on the graph.

The database may store a collection of strategy objects or complete strategies.

The database may store processed data acquired from the controller and evaluation results from other strategies implemented in the controller.

The method may further include the step of downloading the strategy to the controller.

Further in carrying out the above object and other objects of the present invention, a system for developing a strategy for use in a controller is provided. The system includes a display, means for displaying graphical representations of possible data analysis and monitoring operations on the display, means for displaying a graph on the display and means for receiving commands from a user of the system to select graphical representations from the displayed graphical representations and to display the selected graphical representations on the graph. The selected graphical representations correspond to desired data analysis or monitoring operations. The system further includes means for automatically generating a strategy which corresponds to the selected graphical representations on the graph.

The system may further include means for displaying a graphical representation of processed data on the graph.

The system may further include means for automatically updating the interdependencies and states.

The system may further include means for acquiring the processed data from the controller prior to displaying the graphical representation of the processed data on the graph.

The system may further include means for retrieving the processed data from a database prior to displaying the graphical representation of the retrieved processed data on the graph.

The system may further include the database and wherein the database stores a collection of strategy objects or complete strategies.

The system may further include the database and wherein the database stores processed data acquired from the controller and evaluation results from other strategies implemented in the controller.

The system may further include means for downloading the strategy to the controller.

Still further in carrying out the above object and other objects of the present invention, a computer readable storage medium that stores a set of software instructions which, when executed, develops a strategy for use in a controller is provided. The set of software instructions includes instructions for: displaying graphical representations of possible data analysis and monitoring operations on a display of a system; displaying a graph on the display; and receiving commands from a user of the system to select graphical representations from the displayed graphical representations and to display the selected graphical representations on the graph. The selected graphical representations correspond to desired data analysis or monitoring operations. The set of software instructions also includes instructions for automatically generating a strategy which corresponds to the selected graphical representations on the graph.

The storage medium may further include instructions for displaying a graphical representation of processed data on the graph.

The storage medium may further include instructions for automatically updating the interdependencies and states.

The storage medium may further include instructions for acquiring the processed data from the controller and instructions for displaying a graphical representation of the processed data on the graph.

The storage medium may further include instructions for retrieving the processed data from a database and instructions for displaying a graphical representation of the retrieved processed data on the graph.

The database may store a collection of strategy objects or complete strategies.

The database may store processed data acquired from the controller and evaluation results from other strategies implemented in the controller.

The storage medium may further include instructions for downloading the strategy to the controller.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 9 are schematic views of a "teach wizard" from the recall view; the wizard approach is used to automatically update limits in the current strategy based on past runs of the strategy;

FIG. 13 is a series of graphs within a window which illustrate a data layering concept of a monitoring strategy windowing method constructed in accordance with one embodiment of the present invention;

FIGS. 16a and 16b are schematic views of lists of graphical icons or representations, their names and descriptions which provide the building blocks for strategies that can be dragged into the monitoring view or inserted into the monitor list-based panel representation as illustrated in FIG. 2.

DETAILED DESCRIPTION OF THE PREFERRED EMBODIMENT(S)

Figure 1:
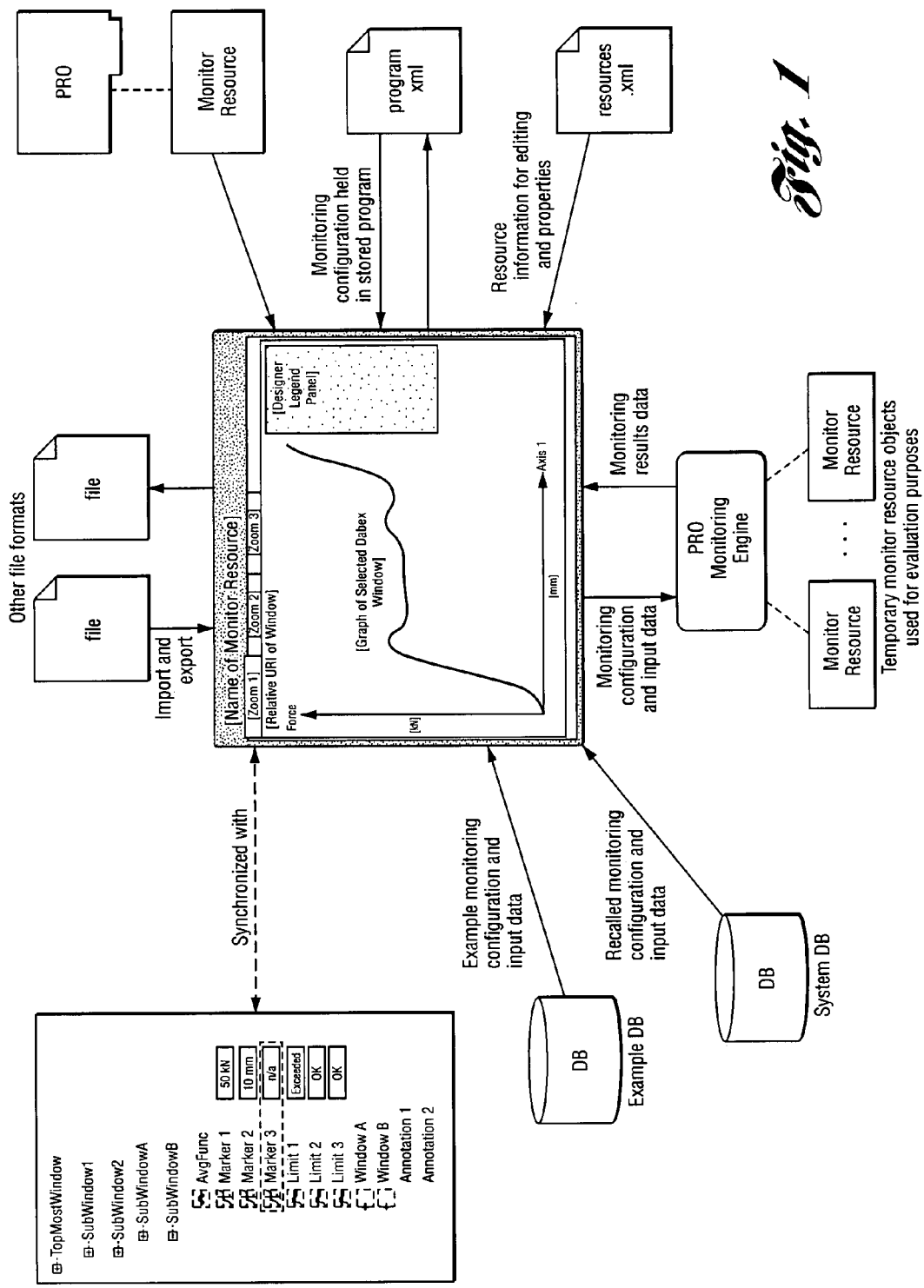
FIG. 1 is a schematic of monitor view architecture which provides an overview of the user interface side of monitoring.

In general, the present invention involves a method and system for developing a strategy for use in a controller and storage medium for storing instructions which effectuate the method. Computer visual interactive techniques and a heuristic approach are applied to data analysis and monitoring program development.

The unique features of at least one embodiment of the present invention include the following:

Graphics are used to "program" the strategy by using a mouse along with accurate metaphors of strategy objects; the goal is: "what you see is what you get";

Changes made to a strategy are visualized immediately on the screen; no need to run the strategy on the embedded controller; this allows a strategy developer to work while the manufacturing or testing process is running;

A database of strategy examples is available for experimenting with data and strategies; and A database of all manufacturing quality data collected is available for experimentation and to perform machine-learning activities.

In general, and as described in detail herein, in at least one embodiment of the present invention strategy development eliminates computer programming by offering a computer graphic approach. In this approach the user is presented with a blank 2-dimensional graph on the computer screen along with X and Y axes. Using available toolbars and palettes, the user drags appropriate graphic objects into the graph. Each object represents an operation to perform for data analysis or monitoring such as: data acquisition, data transformation or operating limits.

Once the user has developed an initial strategy, he next chooses to visualize the data by either A) acquiring data immediately or B) grabbing data previously acquired and stored in a database. When the data is shown in the graph, all other graph objects respond instantly by updating their interdependencies and visually reflecting their new states.

The user continues to refine the strategy by downloading it to the embedded controller and testing its effectiveness and debugging the strategy.

There are two different types of databases used to assist strategy development. One is used to store all process data acquired and the evaluation results of every strategy implemented in the embedded controller. The other database is used for experimentation purposes. It is organized by the user into a collection of strategy objects or complete strategies.

In general and by way of background, a monitor resource represents a set of instructions to implement a monitoring strategy. During firmware run time, it is represented by a C++ object with the following characteristics:

It inherits from Resource type. As it turns out, there are many other types of resources in the firmware.

It has a particular interface of functional methods to do things specific to that type of resource.

It has a collection of properties that define how the monitor resource should behave overall.

It contains a Window type resource called the "base window." This base window, in turn, contains multiple windows among other monitor entities.

A monitor resource contains multiple "monitoring entities," which are just other types of resources that do very specific things. The different major types of monitoring entities are:

Window
Function
Limit
Marker

There are several sub-types underneath each of the above major types.

A monitor resource has a persistent form embodied as an XML element, which is typically contained within a larger program. The XML element stores all of the properties of the monitoring entities contained within the monitoring resource.

Referring now to the drawing figures, FIG. 1 is a schematic of monitor view architecture which provides an overview of the user interface side of monitoring. Starting with the monitor resource contents panel (upper-left corner) and working clockwise:

(1) The monitor resource contents displays a tree-like list of monitoring entities that comprise the monitor resource being viewed. Here the user may add, change, and remove entities and see the last results of a strategy change or simply the last part run of the monitor resource in the firmware. This panel is always synchronized with what is displayed in the graph; entities are added to the monitor resource contents panel when they show up in the graph. When entities are added in the graph, then they show up in the contents panel.

(2) Monitoring data may be exported to various file formats including comma-separated-value (CVS) text files and Microsoft Excel compatible files. Monitoring data may also be imported from similar file formats.

(3) The monitoring view reads monitoring results and other information when displaying "live" information. For example, during part runs, the monitoring data can appear to update in real-time.

(4) The monitoring strategy is stored in the larger context of a program (program.xml) that is transferred to the firmware device for it to execute the program. The monitoring view reads the strategy from the program and writes the strategy back when changes are made.

(5) In order for the monitoring view to "know" what monitoring entities are available for insertion into the monitor resource and further to know what properties a monitoring entity has, it relies on an XML file called "resources.xml."

(6) The "what-if" and interactive nature of the monitoring view is made possible by the PRO Monitoring Engine or "engine." The engine is an exact duplicate of the computer code normally running on the firmware to carry out the monitoring strategy. When the user makes changes to the monitoring resource, the view recalculates the effect or results of the changes by passing the monitoring resource through the engine. The engine runs through the same calculations that the firmware would perform on the monitor resource and returns the results back to the monitor view. The monitor view is thus able to display the results instantly after a strategy change is made.

(7) The system database contains all the collected information of past part runs monitoring resources. For each part run, the system database stores both a snapshot of the monitoring strategy used and the results from applying the strategy to measured data during the run.

(8) The example database contains various configurations of monitor resources that the user has decided to keep around for experimentation or productivity purposes. A configuration of a monitor resource can be as simple as a single acquired curve to a complete monitoring strategy. A configuration can also contain individual monitoring entities such as functions, limits, and markers. The example database is used primarily by the Examples Panel, which interacts with the monitoring view.

Figure 2:
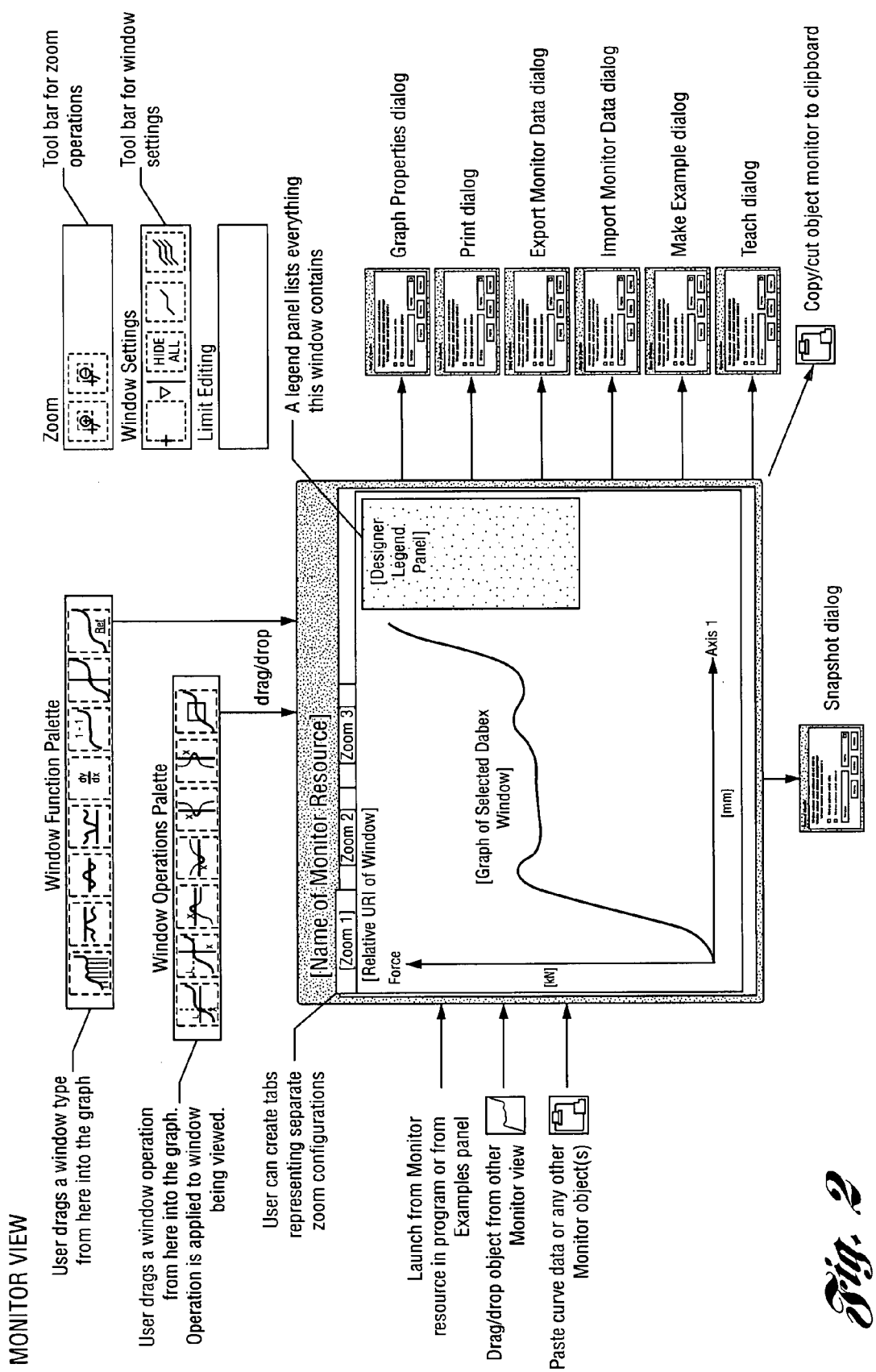
FIG. 2 is a schematic of a monitor view which illustrates interaction with a monitoring strategy.

FIG. 2 is a schematic of a monitor view which illustrates interaction with a monitoring strategy. This diagram describes monitor view and everything that interacts with it. The monitor view has three major modes of operation: edit, live, and data recall. These modes are described in other figures.

Starting with the Window Function Palette (upper-left corner) and working clockwise:

(1) The Window Function Palette and Window Operations Palette represent monitoring entities. The user can drag an item (represented as an icon) from one of the palettes into the graph in which case this adds the corresponding entity to the monitor resource. As the user drags the icon into the graph, the icon changes into a ghosted visual representation of the monitoring entity once it is dragged over the graph area. This adds to the intuitiveness of working graphically with the monitor resource.

(2) Various tool bars are available for commands involving the monitoring view, the monitoring resource, or monitoring entities.

(3) An optional legend panel shown directly in the graph (or near the graph) provides a visual key to the monitoring entities shown in the graph.

(4) Various form and wizard dialog windows complement the monitor view.

(5) The monitoring view interacts fully with the system clipboard by allowing monitoring entities to be cut, copied, and pasted via the clipboard.

(6) The Snapshot dialog lets the user take the current visual representation of what is seen in the view and store it as a bitmap. Using a wizard approach, the user can store the bitmap as a file or send it somewhere via email.

(7) Curve data (including any other monitor entity) can be pasted directly into monitor view via the clipboard.

(8) Monitoring entities can be dragged visually and dropped into the view from another monitoring view or monitoring resource contents panel.

(9) Among other methods, the monitoring view can be launched directly from the examples panel. This allows the user to develop example strategies separate from any programs running on the firmware.

(10) The user can create multiple "zooms" of the monitor resource. Each zoom focuses on a particular monitor window entity within the monitor resource. A zoom only shows monitor entities for a particular monitor window.

Figure 3:
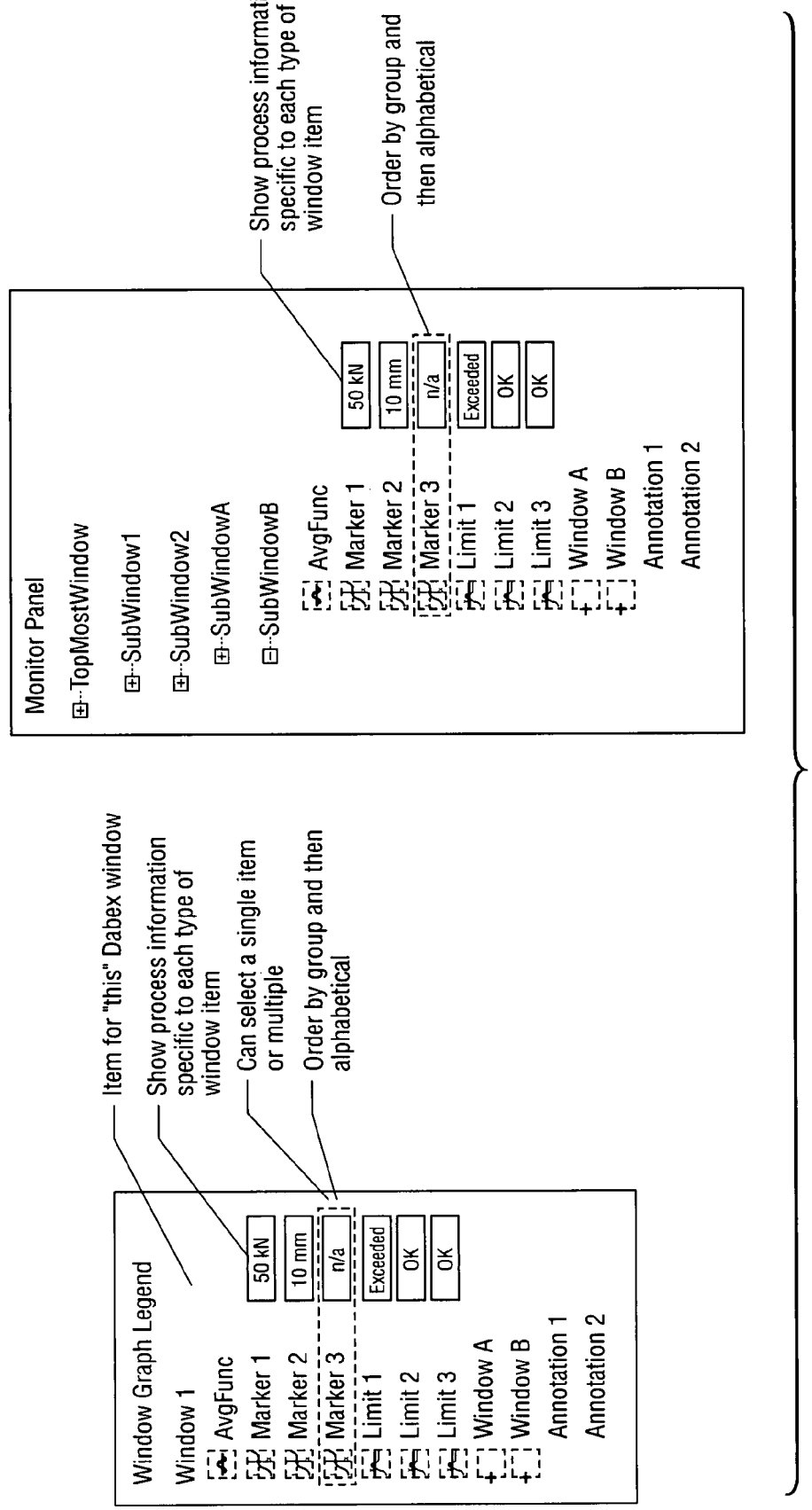
FIG. 3 are schematic views of a legend panel and a monitor panel; the legend panel may appear in the monitor view and the monitor panel is an alternate view of a monitoring strategy and represents all that can be seen in the monitor view.

FIG. 3 are schematic views of a legend panel and a monitor panel; the legend panel may appear in the monitor view and the monitor panel is an alternate view of a monitoring strategy and represents all that can be seen in the monitor view. From left to right:

(1) The graph in the monitor view has a legend. This legend describes every monitoring entity present directly underneath the monitoring window in which the user is zoomed into. If certain entities are not visible because of the zoom settings, then at least the user knows what entities exist by referring to the legend.

(2) There is an optional panel called the Monitor Panel that shows a tree-like list of the contents in a monitor resource. Using this panel the user can see the entire contents of a monitor resource.

Figure 4:
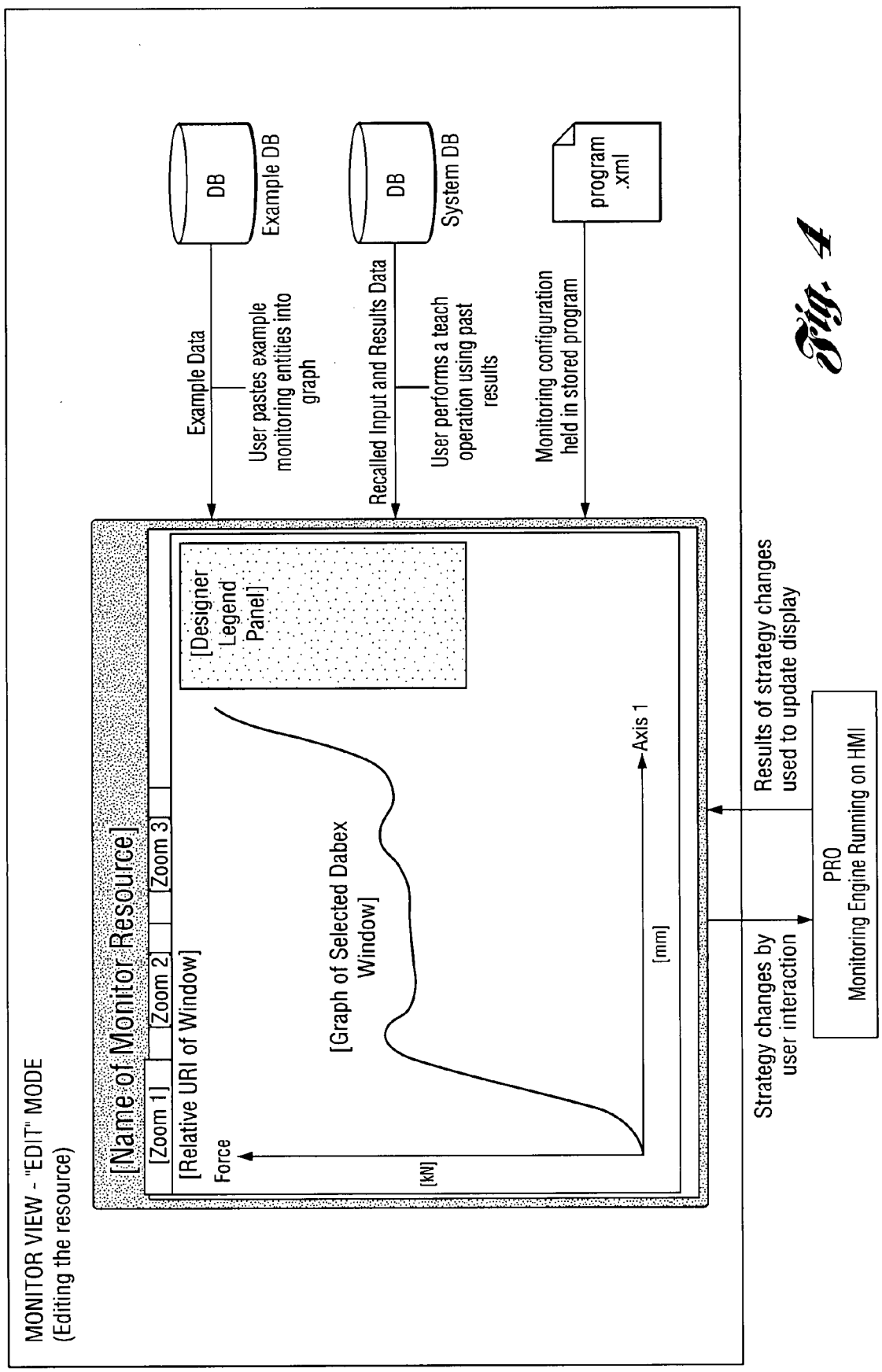
FIG. 4 is a schematic of a monitor view in an edit mode which is entered when a user begins to change a strategy; as in FIGS. 1 and 5, "PRO" represents an embedded controller and "Monitor Resource" represents a resource or software object inside firmware of the embedded controller.
Figure 5:
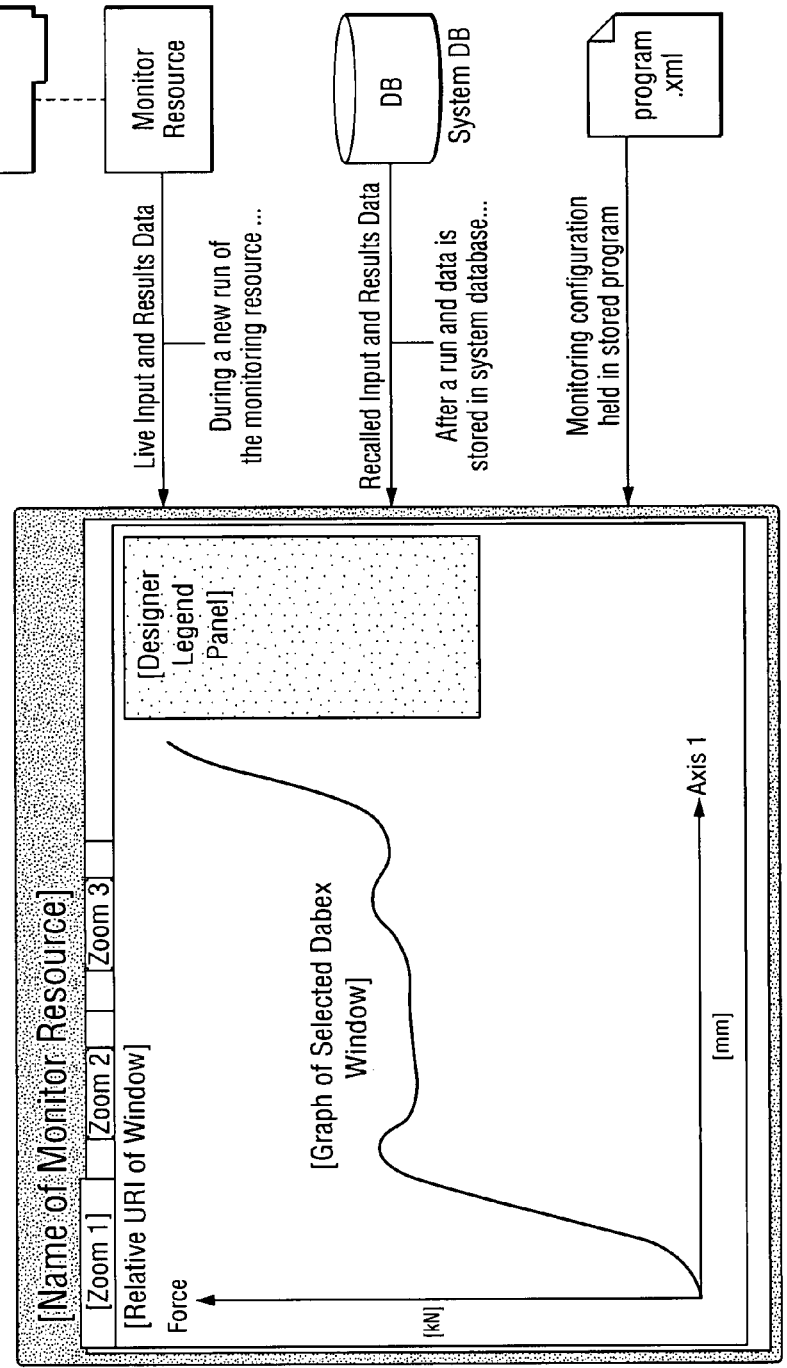
FIG. 5 is a schematic of a monitor view in "live mode" which is the mode for seeing what is correctly happening with the monitor strategy.

FIG. 4 is a schematic of a monitor view in an edit mode which is entered when a user begins to change a strategy; as in FIGS. 1 and 5 "PRO" represents an embedded controller and "Monitor Resource" represents a resource or software object inside firmware of the embedded controller. When the monitor view is in edit mode, the user can interact with the graph by adding, changing, or removing monitoring entities such as functions, limits, and markers. As changes are made to the monitoring strategy, the PRO monitoring engine is utilized to recalculate the expected results of the strategy. Monitoring entities can be added by dragging items from the monitoring palettes, using the pull down menus, using the right-click menus, and dragging items from the examples database.

FIG. 5 is a schematic of a monitor view in "live mode" which is the mode for seeing what is correctly happening with the monitor strategy. The live mode displays the monitoring strategy along with whatever results have been calculated by the firmware. The results come from the system database and from live data feeds from the monitor resource running in the firmware. In the live mode, there is an option to see real-time curve data as it is being acquired by the firmware. In this situation the user sees the acquired curve being drawn continuously as the data is measured.

Figure 6:
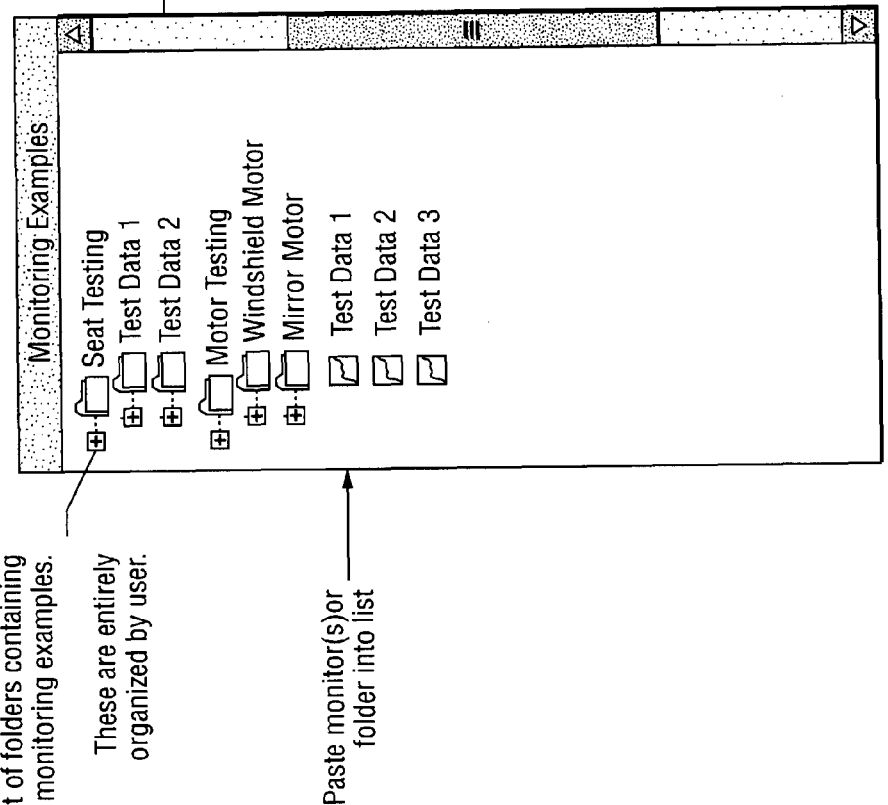
FIG. 6 is a schematic view of an examples panel which is useful for doing "what if" experimentation with monitoring strategies.

FIG. 6 is a schematic view of an examples panel which is useful for doing "what if" experimentation with monitoring strategies. The examples panel represents a collection of monitoring entities organized by the user for the sake of applying example strategies and results to existing or new strategies in development. This panel allows for easy dragging and dropping of entities from and to the monitoring view, the monitoring contents panel, and the Window Legend panel.

Figure 7:
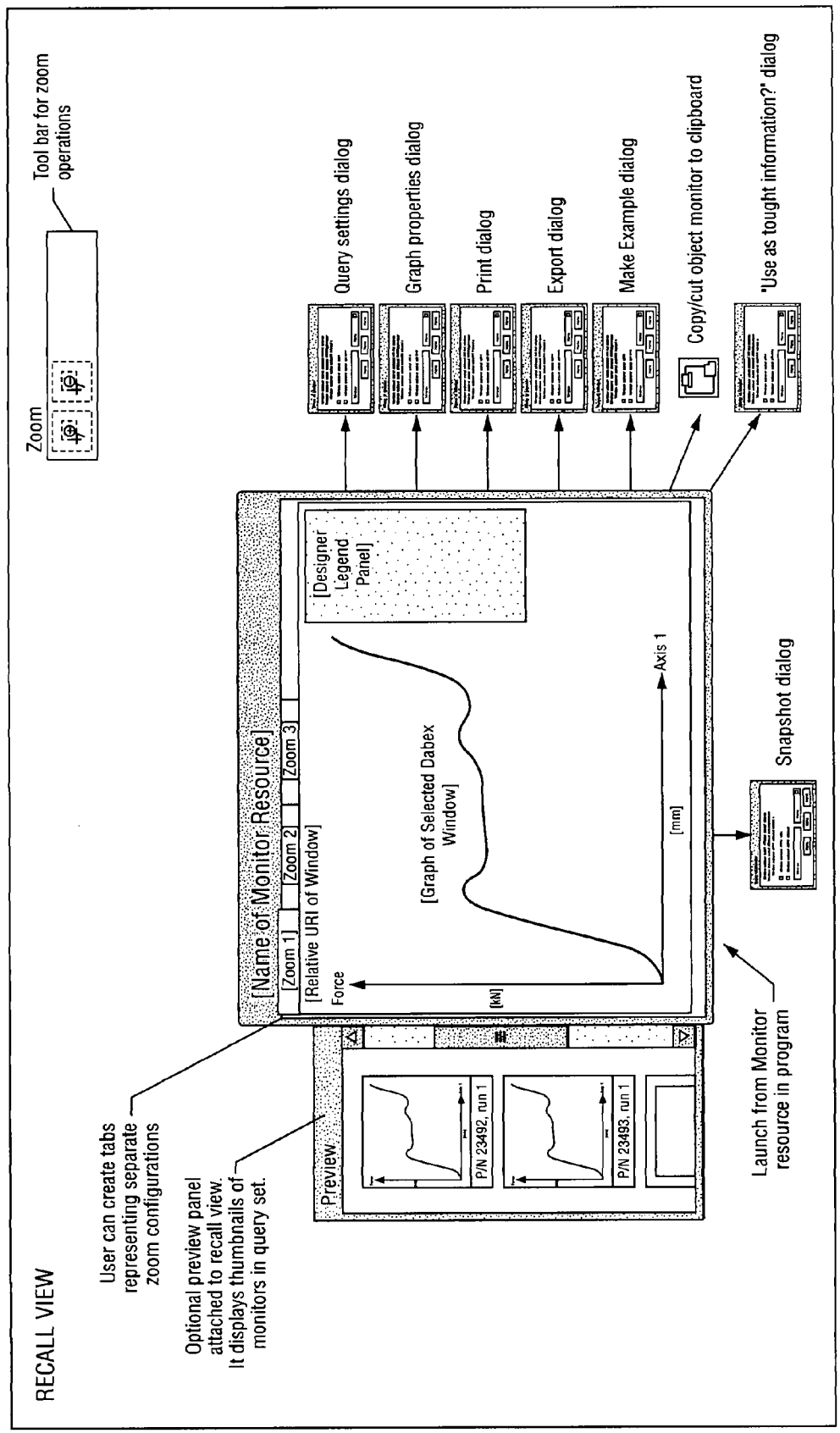
FIG. 7 is a schematic of a recall view which is a variation of the monitor view and is used to recall past runs of a strategy; the recall view allows a user to analyze past data and modify the correct strategy based on past data (i.e., a heuristic approach)

FIG. 7 is a schematic of a recall view which is a variation of the monitor view and is used to recall past runs of a strategy; the recall view allows a user to analyze past data and modify the current strategy based on past data (i.e., a heuristic approach). The recall view shows strategies and results that have been collected in past runs of monitoring resources. It allows for filtering, searching, and easy traversal of sets of monitoring data. A Preview panel provides a bird's eye view of all the monitors in a query set. Starting with the Preview panel(left side) and working clockwise:

(1) The Preview panel shows a scrollable list of monitor previews. A monitor preview is a small version of what the monitor resource looks like in the graph when selected and viewed. These are also called thumbnails or thumbnail views.

(2) Toolbars are available for zoom operations and recall specific operations (not shown).

(3) There are several form and wizard dialog windows that apply to this view:
   a. Query Settings dialog—allows user to specify the set of monitors to recall.
   b. Graph properties dialog—allows user to change graph colors, background fill, grid pattern, and other characteristics of graph presentation.
   c. Print dialog—allows user to print the graph.
   d. Export dialog—allows user to export data in the graph to a text file or Microsoft Excel compatible file.
   e. Make Example dialog—allows user to turn the recalled monitor into an example monitor resource for strategy development use later on.
   f. Monitor resource entities can be copied to the clipboard for use elsewhere.
   g. Use as Taught Information dialog—the user can quickly use the recalled monitor to teach the current strategy related to the recalled monitor resource.

(4) The Snapshot dialog lets the user take the current visual representation of what seen in the view and store it as a bitmap. Using a wizard approach, the user can store the bitmap as a file or send it somewhere via email.

Figure 8:
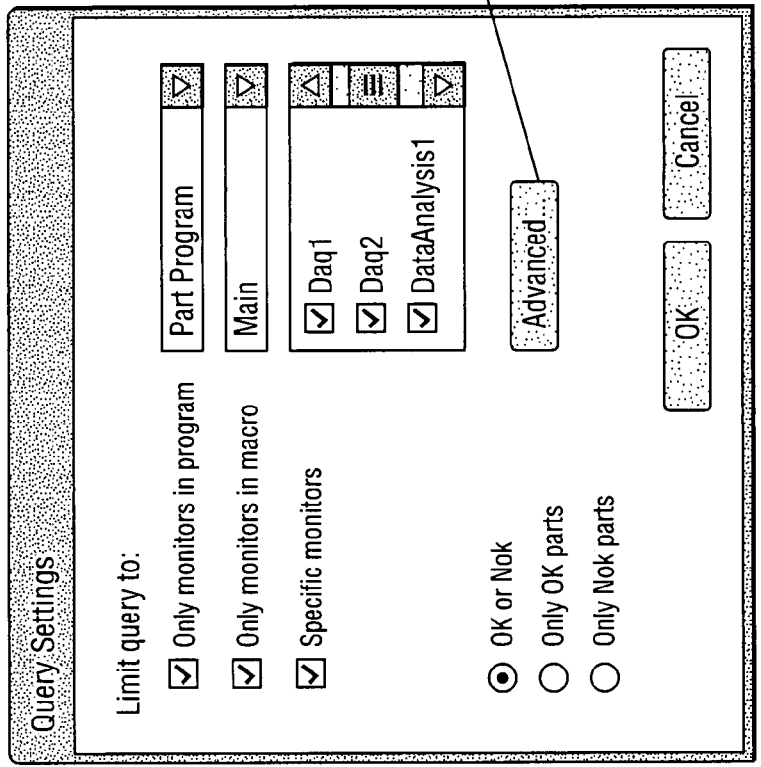
FIG. 8 is a schematic of a query settings dialog box which allows the user to select what is recalled from a database.

FIG. 8 is a schematic of a query settings dialog box which allows the user to select what is recalled from a database. The query settings dialog allows the user to narrow down the recalled set of monitors. Starting with the top field:

(1) "Only monitors in program" limits the query set to a particular part program.

(2) "Only monitors in macro" limits the query set to a particular macro name.

(3) "Specific monitors" limits the query set to particular monitor resources.

(4) The user can further restrict the query set based on evaluation status OK (okay) or Nok (not okay).

(5) A button is provided to enter an "Advanced Query Settings" dialog (not shown) where the user can enter an SQL expression to define the query set.

Figure 9:
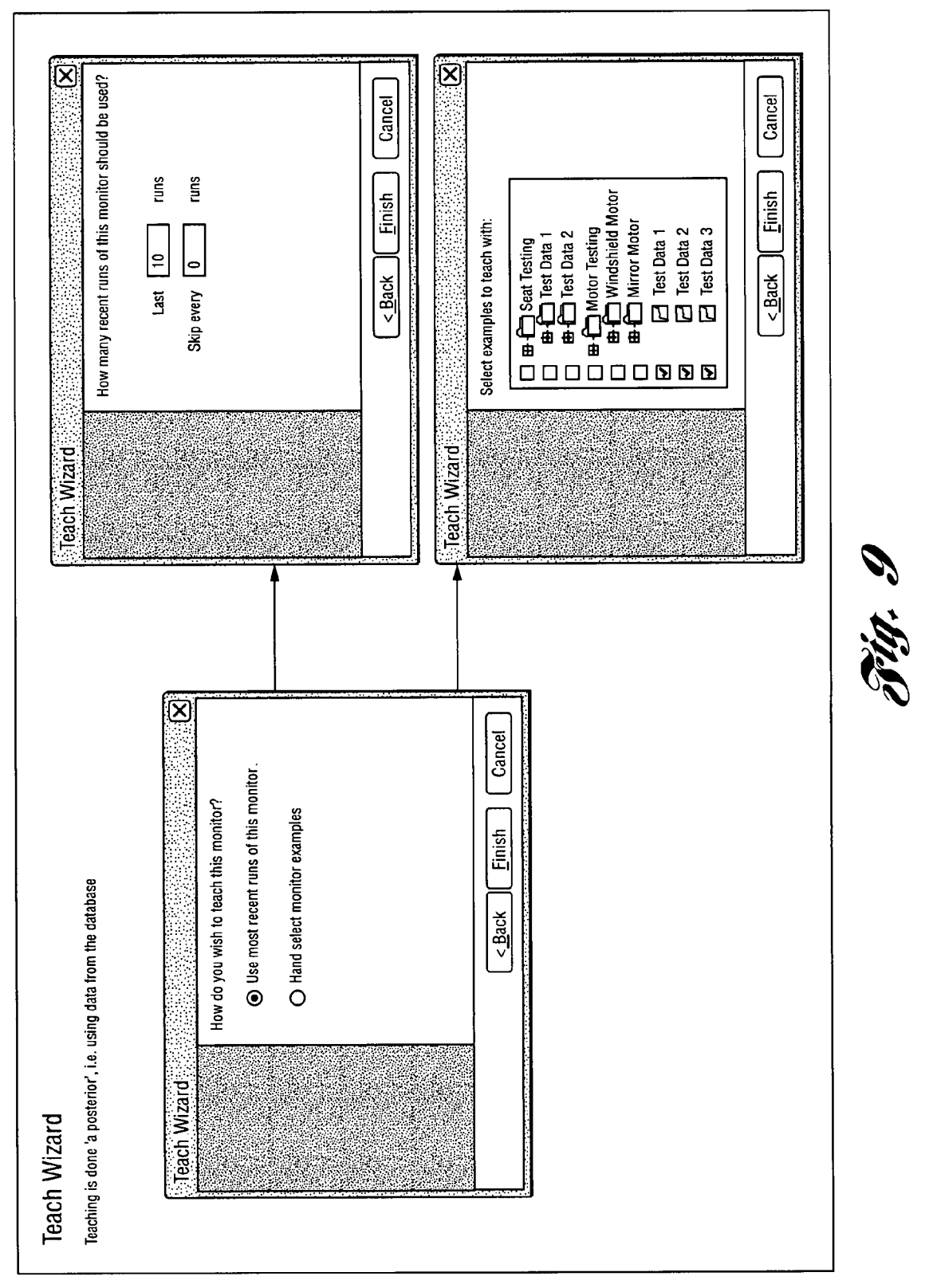

FIG. 9 are schematic views of a "Teach Wizard" from the recall view; the "wizard" approach is used to automatically update limits in the current strategy based on past runs of the strategy. The Teach Wizard provides a method of teaching a monitor resource from past collected information contained in the system database.

There are two basic approaches employed here: teaching from a recent sequence of runs or teaching from particular monitoring examples in the examples database. Teaching from a recent sequence of runs requires two parameters: "Last N runs" and "Skip every M runs". This means it will go back as far as N runs and use every Mth run from that point forward to the most recent run when teaching the monitor resource.

Figure 10:
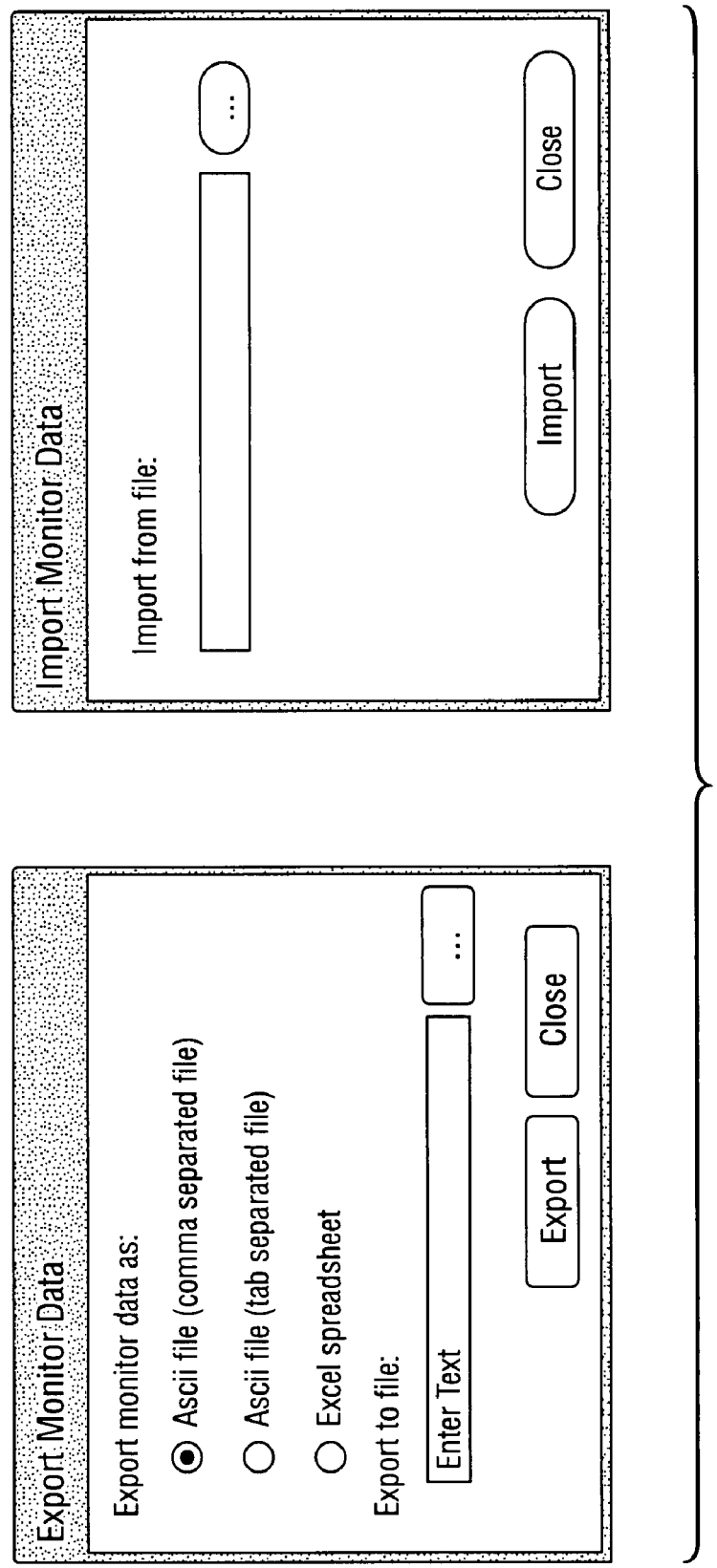
FIG. 10 are schematic views of export and import dialog boxes which allow the export of data from any of the monitoring views and the import of data into the strategy for reference purposes or for "what if" analysis, respectively.

FIG. 10 are schematic views of export and import dialog boxes which allow the export of data from any of the monitoring views and the import of data into the strategy for reference purposes or for "what if" analysis, respectively. The first dialog window, Export Monitor Data, is responsible for exporting graph curve data to a specific file type. To perform the export, the user first selects the file type, the location where the file is to be stored, and chooses the "Export" button to begin the export process.

The second dialog window, Import Monitor Data, is responsible for importing graph curve data from a file. To perform the import, the user first enters the location of the file to import. Next the user chooses the "Import" button to begin the import process.

Figure 11:
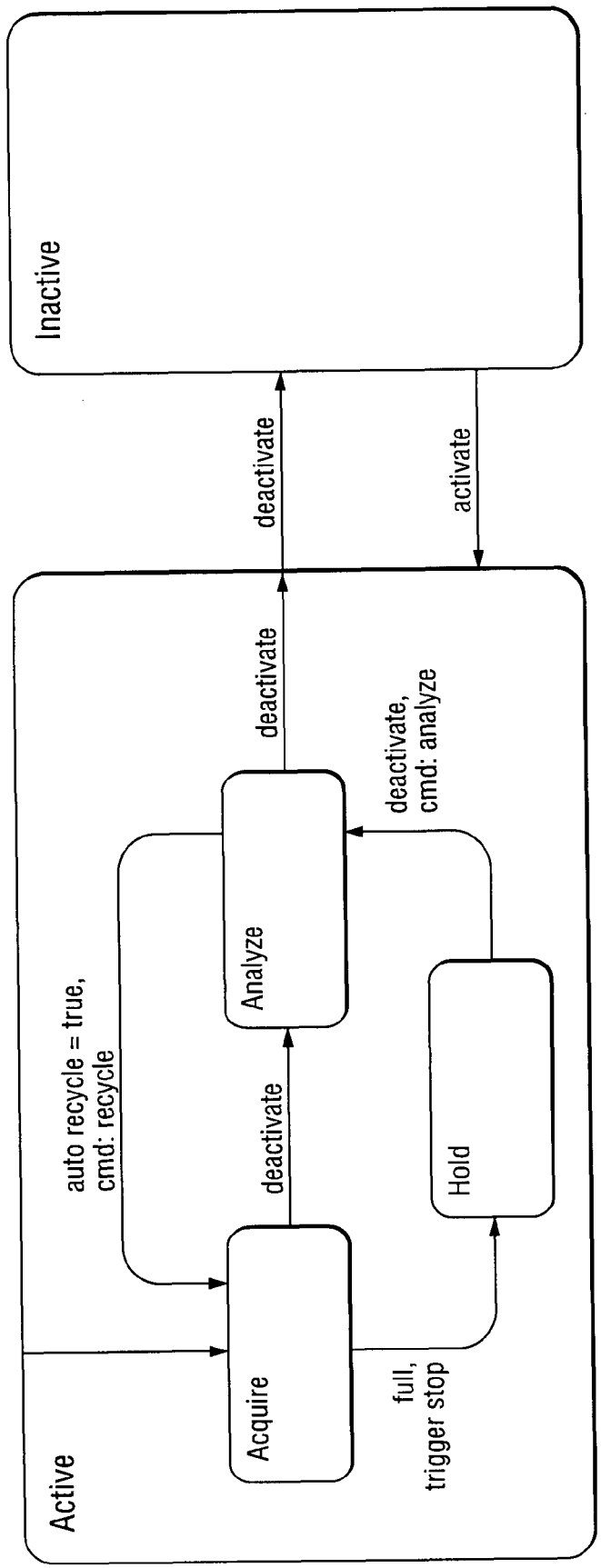
FIGS. 11 and 12 are block diagram flow charts which illustrate a few basic states of processing when a monitoring resource "runs" inside embedded firmware.
Figure 12:
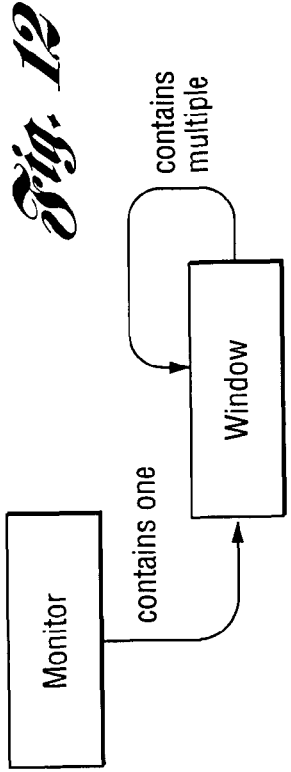

FIGS. 11 and 12 are block diagram flow charts which illustrate a few basic states of processing when a monitoring resource "runs" inside embedded firmware. As shown in FIG. 11, there are two primary states of a monitor resource during firmware operation: Active and inactive. Upon entering the Active state, the monitor resource is in the "Acquire" sub-state. Once the acquisition state is finished as a result of a trigger condition or by an external command, the monitor enters the "Hold" sub-state. If the monitor is deactivated during the Acquire sub-state then it proceeds immediately to the "Analyze" sub-state. The monitor goes into the "Analyze" sub-state from the "Hold" sub-state when the resource becomes deactivated or an external command is given forcing the monitor to analyze its contents. In the "Analyze" state the monitor evaluates each window contained in the monitor resource. Once the analysis is done, the monitor resource enters the "inactive" state.

FIG. 12 describes the containment relationship of the monitor resource and its child window resources. More specifically, a monitor resource contains a "base window" that can contain any number of other windows. Each window can also contain other windows and so on.

FIG. 13 is a series of graphs within a window which illustrate a data layering concept of a monitoring strategy windowing method constructed in accordance with one embodiment of the present invention. The processing of window data proceeds from parent to child where a parent window contains the "input" data that is processed further by its contained child windows. This figure shows an example involving three windows(1, 2, 3). Window 1 is the parent window of 2, which the parent window of 3. When window 1 is processed, a set of data is produced as a result. Next window 2 is processed by "clipping" the data from window 1, applying it to one or more functions and collecting the results of the functions to serve a window 2's data. Last, window 3 is processed by taking the data of window 2 produced in the previous step, clipping it and passing it into window 3's functions producing data for window 3.

Figure 14:
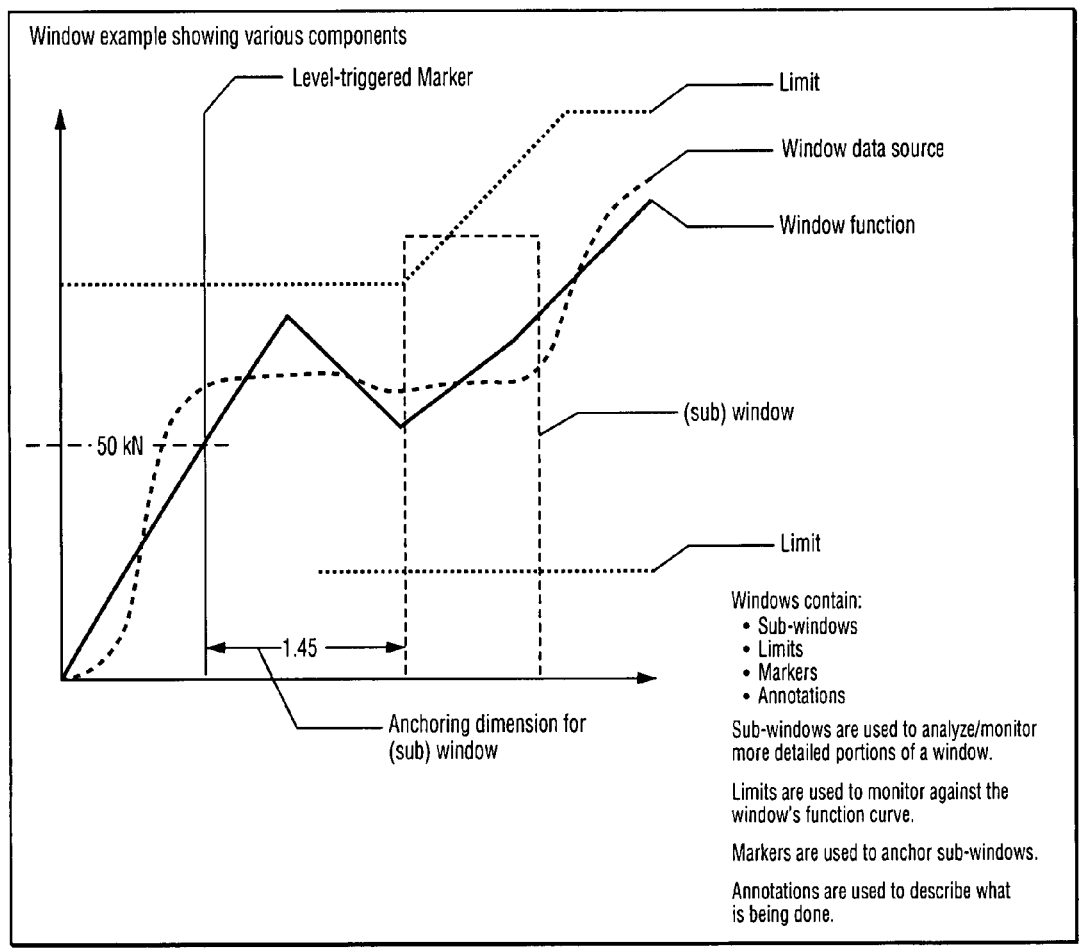
FIG. 14 is a schematic view of a window example showing various components including sub-windows, limits, markers and annotations constructed in accordance with an embodiment of the present invention.

FIG. 14 is a schematic view of a window example showing various components including sub-windows, limits, markers and annotations constructed in accordance with an embodiment of the present invention. A window contains the following types of monitoring entities:

Other "sub" windows
Functions
Limits
Markers
Annotations

Figure 17:
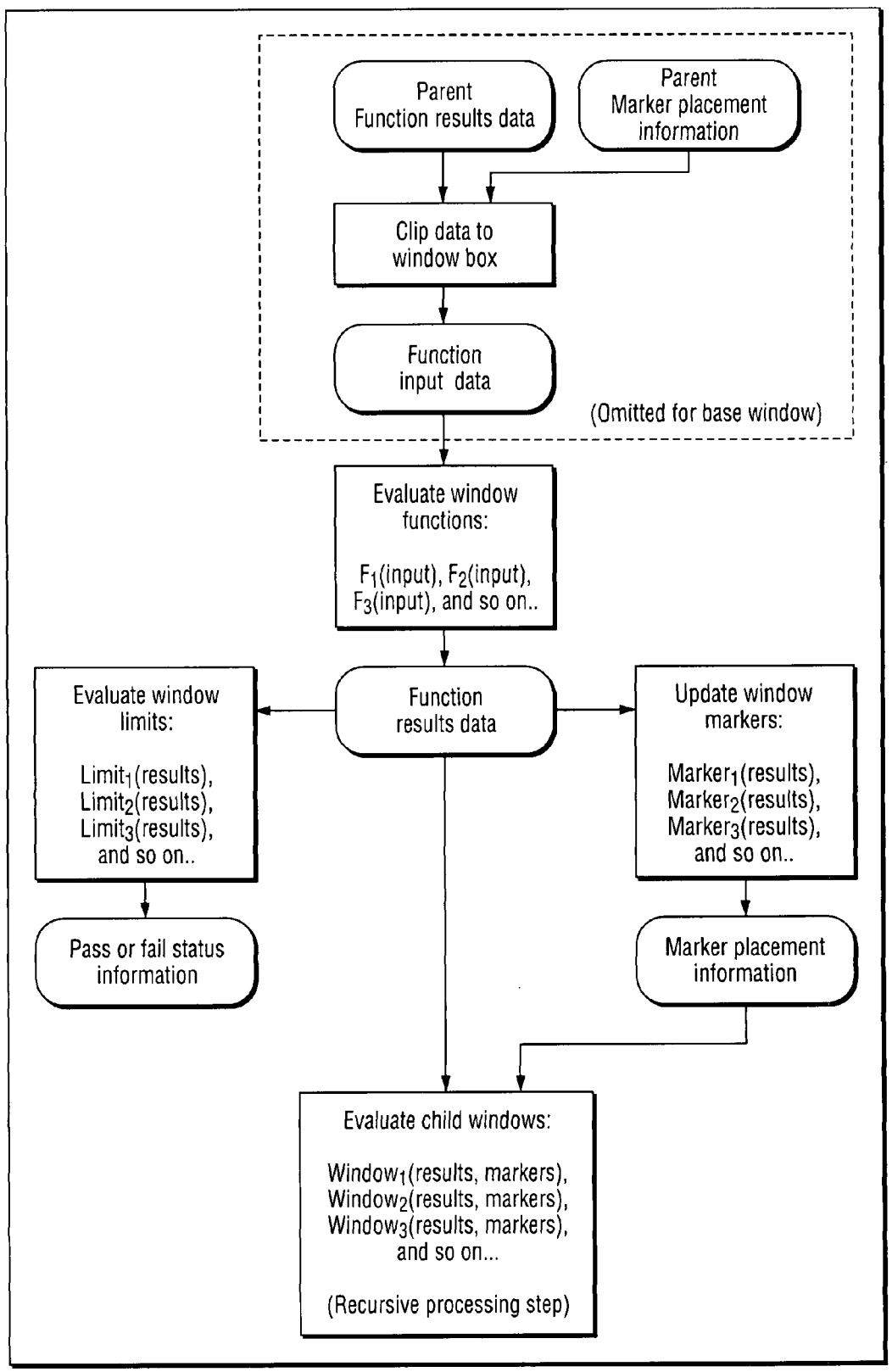
FIG. 17 is a block diagram data flow chart of monitoring window processing which describes how a window is evaluated.

Referring now to FIG. 17, a window is evaluated as follows:

1. The window's parent data is clipped to a box defined by the window. Marker-type entities in the window's parent are used to place the box in the coordinate space of the parent.
2. This clipped data is supplied as input to the functions of the window. These functions usually produce "result" data.
3. The result data is compared against limit-type monitoring entities.
4. The result data is used to update marker-type monitoring entities. These markers are potentially used by child windows to place their clipping boxes.

Figure 15:
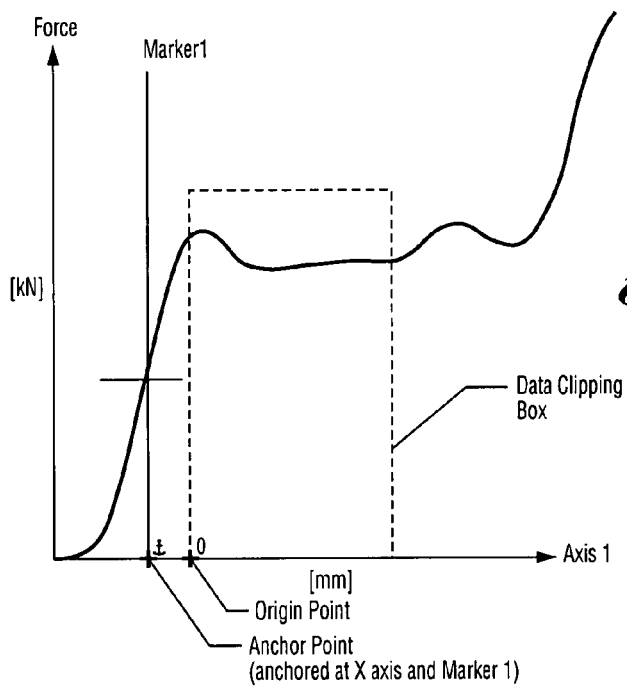
FIG. 15 is a graph of force vs. distance together with a marker, origin and anchor points and a data clipping box which collectively illustrate an anchoring method for window data layering inside a strategy in accordance with an embodiment of the present invention.

FIG. 15 is a graph of force vs. distance together with a marker, origin and anchor points and a data clipping box which collectively illustrate an anchoring method for window data layering inside a strategy in accordance with an embodiment of the present invention. FIG. 15 describes how data clipping works. A child window defines the dimensions of a box (represented with dashed lines) within the parent window coordinate space, e.g. width and height of box. The child window also specifies two marker entities (an X marker and a Y marker) in the parent to use for anchoring the clipping box.

The user can easily define the anchor point by dragging (with the mouse) the anchor icon to any intersection of markers in the parent graph. By default, the X and Y axes are also used as marker entities.

The child window also defines an origin point relative to the anchor point. The origin point defines where coordinates 0, 0 in the child window lie within the parent window.

The user can easily define the origin point by dragging (with the mouse) it to any place in the parent window.

FIGS. 16a and 16b are schematic views of lists of graphical icons or representations, their names and descriptions which provide the building blocks for strategies that can be dragged into the monitoring view or inserted into the monitor list-based panel representation as illustrated in FIG. 2. FIGS. 16a and 16b provide a survey of the monitor entities available in the pallette for use in monitor resources.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for developing a monitoring strategy for use in a controller using a computer system, the method comprising the steps of:

displaying graphical representations of possible monitoring operations on a display of the system;
displaying a 2D graph on the display;

receiving commands from a user of the system to select graphical representations from the displayed graphical representations and to display the selected graphical representations on the graph, the selected graphical representations corresponding to desired monitoring operations wherein different types of monitoring entities including window and marker monitoring entities are used within the graph to describe corresponding monitoring specifics including windowing, anchoring of windows, and triggers wherein the window monitoring entity represents a subsection of the graph and wherein the marker monitoring entity is used to automatically determine placement of a window within the graph and wherein the triggers are utilized to recognize graph features that indicate locations in the graph where the marker monitoring entity is automatically placed; and automatically generating a strategy which corresponds to the selected graphical representations on the graph.

2. The method as claimed in claim 1 further comprising displaying a graphical representation of processed data on the graph.

3. The method as claimed in claim 2 further comprising acquiring the processed data from the controller prior to the step of displaying the graphical representation of the processed data on the graph.

4. The method as claimed in claim 2 further comprising retrieving the processed data from a database prior to the step of displaying the graphical representation of the processed data on the graph.

5. The method as claimed in claim 4, wherein the database stores a collection of strategy objects or complete strategies.

6. The method as claimed in claim 4, wherein the database stores processed data acquired from the controller and evaluation results from other strategies implemented in the controller.

7. The method as claimed in claim 1, wherein the selected graphical representations are objects having interdependencies and states.

8. The method as claimed in claim 7 further comprises automatically updating the interdependencies and states.

9. The method as claimed in claim 1, wherein at least one of the graphical representations represents one of: data acquisition, data transformation and operating limits.

10. The method as claimed in claim 1, wherein the monitoring strategy is a program-wide monitoring strategy.

11. The method as claimed in claim 1, wherein the monitoring strategy is a macro-wide monitoring strategy.

12. The method as claimed in claim 1, wherein the monitoring strategy is a side-step monitoring strategy.

13. The method as claimed in claim 1, wherein, when the controller is programmed with the strategy, the programmed controller performs monitoring.

14. The method as claimed in claim 1, wherein the 2D graph has orthogonal axes.

15. The method as claimed in claim 1 further comprising the step of downloading the strategy to the controller.

16. A system for developing a monitoring strategy for use in a controller, the system comprising:
a display;
means for displaying graphical representations of possible monitoring operations on the display;
means for displaying a 2D graph on the display;
means for receiving commands from a user of the system to select graphical representations from the displayed graphical representations and to display the selected graphical representations on the graph, the selected graphical representations corresponding to desired monitoring operations wherein different types of monitoring entities including window and marker monitoring entities are used within the graph to describe corresponding monitoring specifics including windowing, anchoring of windows and, triggers wherein the window monitoring entity represents a subsection of the graph and wherein the marker monitoring entity is used to automatically determine placement of a window within the graph and wherein the triggers are utilized to recognize graph features that indicate locations in the graph where the marker monitoring entity is automatically placed; and means for automatically generating a strategy which corresponds to the selected graphical representations on the graph.

17. The system as claimed in claim 16 further comprising means for displaying a graphical representation of processed data on the graph.

18. The system as claimed in claim 17 further comprising means for acquiring the processed data from the controller prior to displaying the graphical representation of the processed data on the graph.

19. The system as claimed in claim 17 further comprising means for retrieving the processed data from a database prior to displaying the graphical representation of the retrieved processed data on the graph.

20. The system as claimed in claim 19, wherein the system includes the database and wherein the database stores a collection of strategy objects or complete strategies.

21. The system as claimed in claim 19, wherein the system includes the database and wherein the database stores processed data acquired from the controller and evaluation results from other strategies implemented in the controller.

22. The system as claimed in claim 16, wherein the selected graphical representations are objects having interdependencies and states.

23. The system as claimed in claim 22 further comprises means for automatically updating the interdependencies and states.

24. The system as claimed in claim 16, wherein at least one of the graphical representations represents one of: data acquisition, data transformation and operating limits.

25. The system as claimed in claim 16, wherein the monitoring strategy is a program-wide monitoring strategy.

26. The system as claimed in claim 16, wherein the monitoring strategy is a macro-wide monitoring strategy.

27. The system as claimed in claim 16, wherein the monitoring strategy is a side-step monitoring strategy.

28. The system as claimed in claim 16, wherein, when the controller is programmed with the strategy, the programmed controller performs monitoring.

29. The system as claimed in claim 16, wherein the 2D graph has orthogonal axes.

30. The system as claimed in claim 16 further comprising means for downloading the strategy to the controller.

31. A computer readable non-transitory tangible storage medium that stores a set of software instructions which, when executed, develops a monitoring strategy for use in a controller, the set comprising instructions for:
displaying graphical representations of possible monitoring operations on a display of a system;
displaying a 2D graph on the display;
receiving commands from a user of the system to select graphical representations from the displayed graphical representations and to display the selected graphical representations on the graph, the selected graphical representations corresponding to desired monitoring operations wherein different types of monitoring entities including window and marker monitoring entities are used within the graph to describe corresponding monitoring specifics including windowing, anchoring of windows, and triggers wherein the window monitoring entity represents a subsection of the graph and wherein the marker monitoring entity is used to automatically determine placement of a window within the graph and wherein the triggers are utilized to recognize graph features that indicate locations in the graph where the marker monitoring entity is automatically placed; and automatically generating a strategy which corresponds to the selected graphical representations on the graph.

32. The storage medium as claimed in claim 31 further comprising instructions for displaying a graphical representation of processed data on the graph.

33. The storage medium as claimed in claim 32 further comprising instructions for acquiring the processed data from the controller and instructions for displaying a graphical representation of the processed data on the graph.

34. The storage medium as claimed in claim 32 further comprising instructions for retrieving the processed data from a database and instructions for displaying a graphical representation of the retrieved processed data on the graph.

35. The storage medium as claimed in claim 34, wherein the database stores a collection of strategy objects or complete strategies.

36. The storage medium as claimed in claim 34, wherein the database stores processed data acquired from the controller and evaluation results from other strategies implemented in the controller.

37. The storage medium as claimed in claim 31, wherein the selected graphical representations are objects having interdependencies and states.

38. The storage medium as claimed in claim 37 further comprising instructions for automatically updating the interdependencies and states.

39. The storage medium as claimed in claim 31, wherein at least one of the graphical representations represents at least one of: data acquisition, data transformation and operating limits.

40. The storage medium as claimed in claim 31, wherein the monitoring strategy is a program-wide monitoring strategy.

41. The storage medium as claimed in claim 31, wherein the monitoring strategy is a macro-wide monitoring strategy.

42. The storage medium as claimed in claim 31, wherein the monitoring strategy is a side-step monitoring strategy.

43. The storage medium as claimed in claim 31, wherein, when the controller is programmed with the strategy, the programmed controller performs monitoring.

44. The storage medium as claimed in claim 31, wherein the 2D graph has orthogonal axes.

45. The storage medium as claimed in claim 31 further comprising instructions for downloading the strategy to the controller.

* * * * *